(No Model.)
M. A. HUNT.
SPRING BED BOTTOM.
No. 252,772. Patented Jan. 24, 1882.
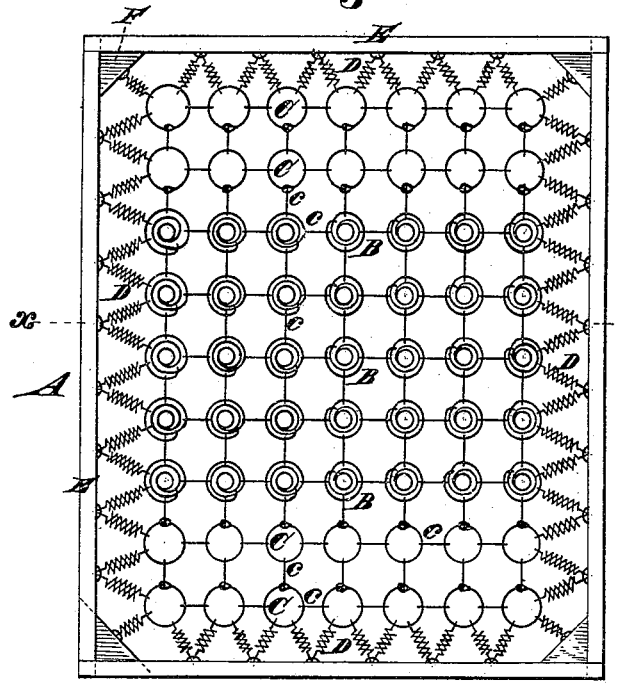
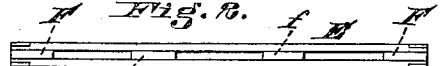
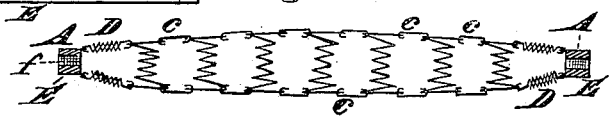
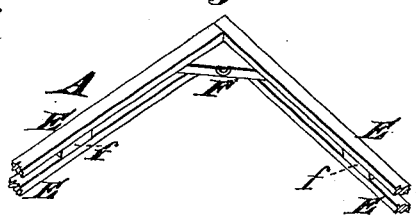
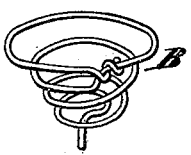
Attest
Jno. L. Jones
Eugene L. Pinkuss
Inventor
Marcus A. Hunt,
by Wood & Boyd,
his Attorneys

UNITED STATES PATENT OFFICE.

MARCUS A. HUNT, OF CINCINNATI, OHIO.

SPRING BED-BOTTOM.

SPECIFICATION forming part of Letters Patent No. 252,772, dated January 24, 1882.

Application filed July 2, 1881. (No model.)

*To all whom it may concern:*

Be it known that I, MARCUS A. HUNT, a citizen of the United States, and a resident of Cincinnati, in the county of Hamilton and State of Ohio, have invented certain new and useful Improvements in Spring Bed-Bottoms, of which the following is a specification.

My invention relates to an improvement in spring-beds.

It consists, first, in providing a suspended spring-bed which is formed of a series of rows of double spiral or hour-glass springs. The top and bottom coil of the springs each have an end of the spring locking into the adjacent coil and forming rings of each end of the coils. These hour-glass springs are then secured to each other by transverse links connecting the outer rings together, forming a chain or hook connection of the springs. These series of woven or chain hour-glass springs are then suspended within an open quadrilateral frame by a series of spring-links, connecting each spring of the series at its top and bottom to the top and bottom sides of the suspending frame or arch.

Another feature of my invention consists of a double coiled adjusting spring-link the coils of which are of woven form and turn one into the other over a supporting-spool, and forming a compound interworking adjustable tension-spring.

The object of my invention is to provide a spring-bed without supporting cross-slats which can be easily constructed and secured in position; also, in providing means for adjusting the spring-link connection to the frame of the bed, so that the stretch of the springs may be readily taken up; also, in providing an adjusting spring-link, so that the links connecting the springs to the bed may be readily adjusted to fit the varying width and distance of the parts which are to be connected by the spring links; also, to allow the tension of the spring-bed to be readily adjusted to any desired degree of flexibility or tautness to suit the wishes of the user.

Other features of my invention will be more fully set forth in the description of the accompanying drawings.

In the accompanying drawings, Figure 1 is a plan view of my improvement. Fig. 2 is a side elevation of the sides or ends of the suspending-frame. Fig. 3 is a cross-section on line *x x*, Fig. 1. Fig. 4 is an elevation of the adjustable spring-link. Fig. 5 is a perspective view of a modified form of spring. Fig. 6 is a detail perspective of one of the connecting-rings. Fig. 7 is a perspective view of one corner of the suspending-frame.

Fig. 1 is a plan view of the preferred form of constructing my improved suspended spring-bed, which is shown to have a series or rows of spiral springs, B B, in the central portion of the bed. A A represent the frame between which the springs forming the bed are suspended. B B represent rows of spiral or hour-glass springs. C C represent rows of rings linked to the springs B B upon their inner sides by connecting links or hooks *c*. D D D D represent adjustable link-springs by which the series of springs and rings are connected to and suspended upon the frame-pieces which form the outer boundary of the bed. These springs are of the peculiar form as shown in Fig. 4.

In order to provide means for adjusting the tension of the springs and tautness of the bed, it is desirable to provide some means for adjusting the length of the spring-links, as well as to increase or adjust their tension. This is accomplished by making the spring-link D in two sections, having a hook, *d*, at one end and a series of worms or spiral coil, *d'*, at the opposite end, and to intertwine in the form of worm-threads the spring end of the links. In order to make the suspension more complete, a spool, D', is placed within the coils of the intertwined spring D and effectually prevents their sagging, supporting the coils of the spring-links and keeping them in proper shape. This adjusting spring-link is a particular feature of my invention and adds much to the durability and ease of adjustment of the spring-bed, which forms a special feature of the invention.

It is obvious that other connecting-links might be substituted for the spring-links D in constructing the suspended spring-bed forming the first feature of my invention, which would secure many advantages over other spring-beds in common use.

Figs. 2 and 7 represent an improved form of making the side and end pieces of my suspending-frame. E E represent two parallel strips of wood, half-tenoned at their ends and nailed or fastened to a corner supporting-block, F. *f f* represent supporting-blocks placed in the slot or opening between the frame-pieces E E, and serve to prevent the springing of the frame. This form of making the suspending-frame has several advantages. It is quickly and easily constructed and possesses greater strength to amount of material employed than any other form of quadrilateral open frames.

Instead of employing double hour-glass springs, spiral springs like that shown in Fig. 5, supported on slats, may be employed in combination with my improved frame and adjusting spring connecting-link, and still contain the substantial parts of the second and third features of my invention.

Instead of the rings C, the hour-glass springs might be continued to the outer edges; but two rows of rings at each end can be used at considerable saving of cost and still obtain a very superior bed-bottom.

A bed-bottom made as shown possesses very many advantages over other forms in use. It can be made of much less weight of wire springs, which are arranged so as to secure a great amount of flexibility and wear.

This bed, upon each side, has in substance a spring fabric formed by the rings, being superior and much cheaper than woven-wire mattresses.

I claim—

1. A suspended spring-bed consisting of a series of vertically-arranged hour-glass springs connected to each other at the top and bottom by hooks or links, in combination with a surrounding quadrilateral frame and links connecting both the upper and lower portions of the vertical springs with the upper and lower edges of the surrounding frame, substantially as and for the purposes described.

2. The combination, with a series of vertically-arranged springs, B, and a surrounding frame, A, of the adjustable link-springs D, consisting of two sections, each provided with a hooked end, *d*, and a spiral coil, *d'*, the said coils intertwining with each other and the hooks of the two sections being connected respectively with the vertical springs and the surrounding frame, substantially as described.

3. In combination with the vertically-arranged spiral springs and surrounding supporting-frame, the adjustable intertwining spiral coils *d'*, each provided at its outer end with a hook, *d*, which are connected respectively to the vertical springs, and the spool arranged entirely within the coils *d' d'*, substantially as and for the purposes described.

4. A quadrilateral suspending-frame of a spring bed-bottom, composed of slats E E, attached to corner supporting-blocks, F, and separated by blocks *f*, substantially as herein set forth.

5. A spring bed-bottom composed substantially of the frame A, a series of vertically-arranged spiral springs attached transversely to each other by two series of transverse hooks or links, *c*, and all connected to the said frame by the adjustable spring connecting-links D, as herein set forth.

In testimony whereof I have hereunto set my hand in the presence of two subscribing witnesses.

MARCUS A. HUNT.

Witnesses:
EUGENE L. FIRNKOESS,
J. H. CHARLES SMITH.